US010311366B2

(12) United States Patent
Portilla et al.

(10) Patent No.: US 10,311,366 B2
(45) Date of Patent: Jun. 4, 2019

(54) PROCEDURALLY GENERATING SETS OF PROBABILISTICALLY DISTRIBUTED STYLING ATTRIBUTES FOR A DIGITAL DESIGN

(71) Applicant: Adobe Inc., San Jose, CA (US)

(72) Inventors: Adam Portilla, Seattle, WA (US); Peter O'Donovan, Seattle, WA (US); Satish Shankar, Seattle, WA (US)

(73) Assignee: ADOBE INC., San Jose, CA (US)

(*) Notice: Subject to any disclaimer, the term of this patent is extended or adjusted under 35 U.S.C. 154(b) by 808 days.

(21) Appl. No.: 14/937,577

(22) Filed: Nov. 10, 2015

(65) Prior Publication Data
US 2017/0032269 A1 Feb. 2, 2017

Related U.S. Application Data

(60) Provisional application No. 62/198,537, filed on Jul. 29, 2015.

(51) Int. Cl.
G06F 17/00 (2019.01)
G06N 7/00 (2006.01)
G06F 3/0484 (2013.01)
G06F 17/21 (2006.01)
G06K 9/00 (2006.01)
G06T 11/00 (2006.01)
G06T 11/60 (2006.01)
(Continued)

(52) U.S. Cl.
CPC .......... G06N 7/005 (2013.01); G06F 3/0484 (2013.01); G06F 3/0488 (2013.01); G06F 3/04842 (2013.01); G06F 17/211 (2013.01); G06K 9/00221 (2013.01); G06K 9/00463 (2013.01); G06K 9/6215 (2013.01); G06K 9/6271 (2013.01); G06T 11/001 (2013.01); G06T 11/60 (2013.01); G11B 27/031 (2013.01); G06T 2207/10016 (2013.01); G06T 2207/10024 (2013.01)

(58) Field of Classification Search
None
See application file for complete search history.

(56) References Cited

U.S. PATENT DOCUMENTS 5,860,073 A * 1/1999 Ferrel ............... G06F 17/218
715/255
6,298,157 B1 10/2001 Wilensky
(Continued)

OTHER PUBLICATIONS

U.S. Appl. No. 14/942,503, Oct. 4, 2016, Preinterview 1st OA.
(Continued)

Primary Examiner — Laurie A Ries
(74) Attorney, Agent, or Firm — Keller Jolley Preece

(57) ABSTRACT

The present disclosure is directed toward systems and methods for automatically generating combinations of styling values for application to a digital design. Each of the generated styling value combinations includes styling values selected from one or more probabilistically distributed sets of styling values. One or more embodiments described herein utilize a scoring system to ensure that, when applied to the digital design, the styling values included in the probabilistically distributed sets of styling values will make the digital design look professional and aesthetically pleasing.

20 Claims, 10 Drawing Sheets

(51) Int. Cl.
*G06F 3/0488* (2013.01)
*G11B 27/031* (2006.01)
*G06K 9/62* (2006.01)

(56) References Cited

U.S. PATENT DOCUMENTS

| | | | | |
|---|---|---|---|---|
| 6,809,741 B1* | 10/2004 | Bates | G06F 3/0481 | 345/597 |
| 7,308,418 B2* | 12/2007 | Malek | G06Q 30/02 | 705/7.29 |
| 8,041,111 B1* | 10/2011 | Wilensky | G06T 7/90 | 345/589 |
| 8,416,255 B1* | 4/2013 | Gilra | G01J 3/526 | 345/593 |
| 8,429,524 B2* | 4/2013 | Balinsky | G06F 17/214 | 715/234 |
| 8,849,043 B2 | 9/2014 | Ptucha et al. | | |
| 8,849,853 B2* | 9/2014 | Ptucha | G06T 11/60 | 707/749 |
| 8,872,969 B1* | 10/2014 | Rathi | G06T 11/001 | 348/468 |
| 9,110,977 B1* | 8/2015 | Pierre | G06F 17/30663 | |
| 9,639,969 B1 | 5/2017 | Wilson et al. | | |
| 2001/0054050 A1* | 12/2001 | Weil | G06F 17/212 | 715/234 |
| 2003/0063130 A1* | 4/2003 | Barbieri | G11B 27/105 | 715/833 |
| 2004/0196298 A1* | 10/2004 | Nagahashi | G06T 11/60 | 345/619 |
| 2005/0195331 A1* | 9/2005 | Sugano | G06F 17/30799 | 348/571 |
| 2006/0022759 A1* | 2/2006 | Jeon | H03L 7/0891 | 331/16 |
| 2006/0156220 A1* | 7/2006 | Dreystadt | G06F 17/211 | 715/202 |
| 2007/0061710 A1* | 3/2007 | Chartier | G06F 17/212 | 715/234 |
| 2009/0309894 A1* | 12/2009 | Lam | G06F 17/211 | 345/582 |
| 2010/0199168 A1* | 8/2010 | Balinsky | G06F 17/211 | 715/234 |
| 2010/0223581 A1* | 9/2010 | Manolescu | G06Q 10/00 | 715/853 |
| 2010/0322521 A1* | 12/2010 | Tal | G06T 11/60 | 382/199 |
| 2011/0026835 A1* | 2/2011 | Ptucha | G06F 17/30247 | 382/209 |
| 2011/0157226 A1* | 6/2011 | Ptucha | G06T 11/60 | 345/638 |
| 2011/0261994 A1* | 10/2011 | Cok | G06T 11/60 | 382/100 |
| 2011/0261995 A1 | 10/2011 | Cok | | |
| 2011/0273474 A1* | 11/2011 | Iwayama | G06T 11/60 | 345/636 |
| 2013/0111324 A1* | 5/2013 | Kern | G06F 17/218 | 715/230 |
| 2013/0198617 A1* | 8/2013 | Maloney | G06F 17/30056 | 715/252 |
| 2013/0315477 A1* | 11/2013 | Murray | G06F 17/30265 | 382/159 |
| 2014/0055803 A1* | 2/2014 | Uhlig | G06F 17/212 | 358/1.13 |
| 2014/0173397 A1* | 6/2014 | Pereira | G06F 17/3089 | 715/202 |
| 2014/0181627 A1* | 6/2014 | Schilling | G06F 17/218 | 715/204 |
| 2014/0195921 A1* | 7/2014 | Grosz | G06F 3/1242 | 715/738 |
| 2014/0201623 A1* | 7/2014 | Kattner | G06F 17/218 | 715/235 |
| 2014/0359656 A1 | 12/2014 | Banica et al. | | |
| 2015/0002696 A1* | 1/2015 | He | H04N 5/23222 | 348/231.6 |
| 2015/0379000 A1* | 12/2015 | Haitani | G06F 17/3025 | 707/745 |
| 2016/0092402 A1* | 3/2016 | Martin | G06F 3/04847 | 715/752 |
| 2016/0093080 A1* | 3/2016 | Tumanov | G06T 11/60 | 345/589 |
| 2016/0142625 A1* | 5/2016 | Weksler | H04N 5/23222 | 348/222.1 |
| 2016/0148343 A1* | 5/2016 | Yan | G06T 7/11 | 345/660 |
| 2017/0024363 A1* | 1/2017 | Tocchini | G06F 17/212 | |
| 2017/0032542 A1 | 2/2017 | Shankar et al. | | |
| 2017/0032553 A1 | 2/2017 | O'Donovan | | |
| 2017/0032554 A1 | 2/2017 | O'Donovan et al. | | |
| 2017/0357913 A1* | 12/2017 | Garrison | G06F 17/248 | |

OTHER PUBLICATIONS

U.S. Appl. No. 14/937,619, Feb. 16, 2017, Preinterview 1st OA.
U.S. Appl. No. 14/937,619, Mar. 3, 31, 2017, Office Action.
U.S. Appl. No. 14/942,503, May 31, 2017, Office Action.
U.S. Appl. No. 14/947,683, Jun. 28, 2017, Preinterview 1st OA.
U.S. Appl. No. 14/942,503, Jan. 23, 2017, 1st Action Interview OA Summary.
U.S. Appl. No. 14/937,619, Sep. 8, 2017, Office Action.
U.S. Appl. No. 14/937,683, Sep. 26, 2017, Office Action.
U.S. Appl. No. 14/937,619, Jul. 7, 2018, Notice of Allowance.
U.S. Appl. No. 14/942,503, Feb. 20, 2018, Office Action.
U.S. Appl. No. 14/947,683, Jan. 22, 2018, Office Action.

* cited by examiner

PROCEDURALLY GENERATING SETS OF PROBABILISTICALLY DISTRIBUTED STYLING ATTRIBUTES FOR A DIGITAL DESIGN

CROSS REFERENCE TO RELATED APPLICATIONS

This application claims the benefit of and priority to U.S. Provisional Application No. 62/198,537, filed Jul. 29, 2015, the entire contents of which are hereby incorporated by reference.

BACKGROUND

1. Technical Field

One or more embodiments of the present disclosure relate generally to digital media. More specifically, one or more embodiments of the present disclosure relate to creating digital media.

2. Background and Relevant Art

Users generally spend many hours online every day. For example, a user may read social media posts and news articles online, purchase goods through retail websites online, compose emails and blog posts online, plan vacations online, perform work tasks online, and so forth. It is not surprising that, in light of how much time users spend online, providers of web content typically put great effort into creating web content that quickly draws users' attention. For instance, an advertisement campaign that is professional and eye-catching generally causes online users to become interested in the campaign.

Thus, content providers try to draw online attention in order to entice online users into clicking a hyperlink, viewing an advertisement, providing a response, purchasing a good, etc. Problems arise, however, for many content providers who are not trained or experienced in creating professional and eye-catching digital media (e.g., pictures, videos, etc.). For example, an online user may more readily click on an article that has a well-designed graphic incorporated in the title of the article than on an article that has a simple text-only title. But if the article author or online host of the article has no training in how to create attention-grabbing digital media, providing the desired, eye-catching graphic may prove to be too difficult and time consuming a task.

Even if a content provider has training in digital media design, providing different possible "looks" for a design concept is generally overly time-consuming. For example, in an era of instant information, it is crucial for content providers to churn out aesthetically pleasing digital media very quickly. Despite this, a content provider may still want to consider multiple design options for the same concept. For instance, the content provider may want to see what a design looks like with different colors, fonts, and other styling choices. Accordingly, creating different design choices if often too time consuming and difficult for a content provider to handle when attempting to provide up-to-the-second web content. Thus, content providers often settle for publishing digital media that is not their best effort.

Furthermore, while various types of software exist that facilitate a user editing digital media, these software packages are generally bulky and require a substantial amount of processing power and memory from the computing device on which the software is running Thus, in order to successfully edit digital images, a user generally utilizes a larger computing device, such as a laptop or desktop computer. Additionally, digital editing software run on a larger computer device typically allows the use of additional peripherals, such as a keyboard, a computer mouse, a stylus, etc. Accordingly, conventional system provide users little recourse when faced with a need or desire to create or edit digital images "on-the-go" utilizing a handheld device (e.g., a smart phone, tablet, smart wearable) using only an associated touch screen.

Thus, there are several disadvantages to current methods for quickly creating digital media.

SUMMARY

One or more embodiments described herein provide benefits and/or solve one or more of the foregoing or other problems in the art with systems and methods that provide users with efficient and effective user experiences in creating and modifying digital media. For example, one or more embodiments include systems and methods that enable a user to quickly and easily create different combinations of design elements for digital media without any special design training. In one or more embodiments, systems and methods described herein provide various styling combinations in connection with an underlying design in response to a user's interactions with a graphical user interface control. In particular, the systems and methods generate unique designs that a user can quickly browse to aid in selecting and designing digital media.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the invention will be described and explained with additional specificity and detail through the use of the accompanying drawings in which.

DETAILED DESCRIPTION

Figure 1B:
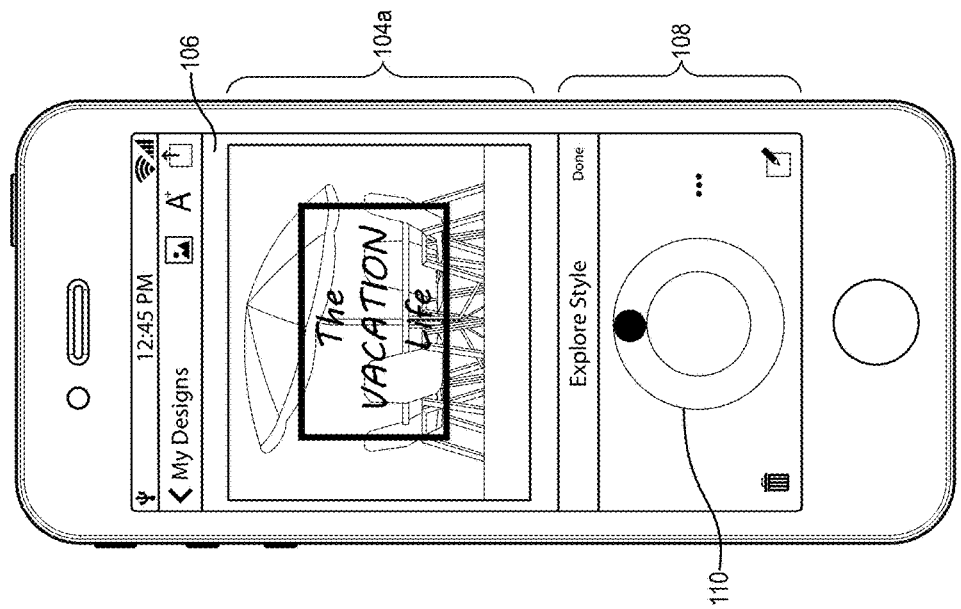
FIGS. 1A-1E illustrate a series of graphical user interfaces in connection with the digital content creation/editing system that allow for automatic generation and selection of aesthetic digital designs in accordance with one or more embodiments.

One or more embodiments described herein include a digital creation/editing system that enables a user to easily create professional and aesthetically pleasing digital media. Specifically, the digital content creation/editing system enables a user to preview and apply multiple combinations of various styling values to a digital design by interacting with a graphical user interface control. For instance, the digital content creation/editing system generates a styling combination for various positions/configuration of the graphical user interface control, such that as a user manipulates the control through various positions, the digital content creation/editing system applies a different styling combination to the digital design. Thus, the user can view multiple styling combinations applied to the digital design without having to select individual styling values one at a time.

Furthermore, the digital content creation/editing system help ensures that each of the generated styling combinations are aesthetically pleasing and within the framework of known style principles. For example, the digital content creation/editing system analyzes the current state of the digital design in order to identify styling attributes and values within the digital design. Then, based on the analysis of the current state of the digital design, the digital content creation/editing system generates a number of styling combinations.

For example, the digital content creation/editing system generates styling combinations by scoring possible styling values associated with each styling attribute. In one or more embodiments, the digital content creation/editing system scores the possible styling values based on their correlation with styling attributes and values identified within the current version of the digital design. This can help ensure that styling combinations evolve from each other rather than appearing random. Additionally, the digital content creation/editing system further scores the possible styling values based on previously calculated scores in a given iteration. This can help ensure that styling combinations are aesthetically pleasing and cohesive.

Once the digital content creation/editing system scores possible styling values in association with the digital design, the digital content creation/editing system creates one or more probabilistically distributed sets of styling values for each styling attribute. In particular, the digital content creation/editing system can weigh each styling value such that a probability that a given styling value will be selected is based on the score of the given styling value compared to the scores of the other styling values within the probabilistically distributed set.

After the digital content creation/editing system generates one or more probabilistically distributed sets for one or more styling attributes, the digital content creation/editing system generates a styling combination for each position associated with a graphical user interface control. For example, the digital content creation/editing system associates a seed value with a first position associated with the control. When a user manipulates the control to the first position, the digital content creation/editing system utilizes the seed value associated with that position to select a styling value from each of the one or more probabilistically distributed sets.

The digital content creation/editing system then applies the selected styling combination to the digital design. In one or more embodiments, the digital content creation/editing system applies a styling combination to a digital design by replacing styling values within the digital design with corresponding styling values from the selected styling combination. Thus, the digital content creation/editing system quickly and easily presents the user with a redesigned digital design. Furthermore, in order to see a new styling combination applied to the digital design, the user only has to manipulate the control to a new position.

The user interface/user experience that the digital content creation/editing system provides to apply various styling combinations will now be described with reference to a series of user interfaces in FIGS. 1A-1E. FIGS. 1A-1E and the related description reference creation and modification of digital designs comprising digital images. One will appreciate that in alternative embodiments, the digital designs can comprise videos, animations, illustrations, or other digital content in addition to, or in place of, a digital image. Thus, the reference to a digital image below is to aid in explaining the various embodiments and should not be considered limiting.

Figure 1A:
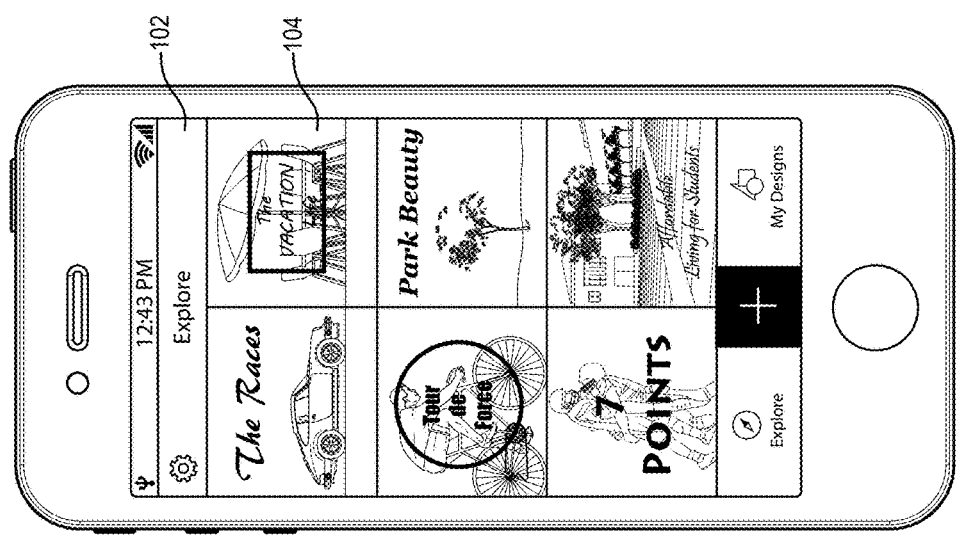

As shown in FIG. 1A, in one or more embodiments, the digital content creation/editing system provides a digital media gallery GUI 102 comprising a plurality of digital designs. As used herein, a "digital design" refers to any type of digital media or multimedia image. For example, a digital design includes, but is not limited to, digital photographs, digital video, computer generated imagery, "GIFs," "JPEGs," "PDFs," etc. In one or more embodiments, a digital design is any type of computer readable media that is capable of being digitally edited.

Furthermore, digital designs include styling attributes and styling values. As used herein, a "styling attribute" refers to a design category. For example, styling attributes include, but are not limited to, colors, fonts, text sizes, backing shapes, overlay shapes, background objects, number of faces, and so forth. In one or more embodiments, a digital design is associated with multiple styling attributes, depending on the complexity of the digital design.

As used herein, a "styling value" refers to a specific value associated with a styling attribute. For example, styling values associated with the "colors" styling attribute include, but are not limited to, red, orange, yellow, green, blue, indigo, violet, white, black, etc. In another example, styling values associated with the fonts styling attribute include, but are not limited to, "Times New Roman," "Calibri," "Verdana," "Wingdings," and so forth.

As used herein, a "styling combination" refers to a combination of styling values, wherein each styling value is selected from a group of styling values associated with a styling attribute. For example, a styling combination may include styling values selected from each of the following styling attributes: fonts, text colors, and overlay shapes. Accordingly, a styling combination may include the following styling values: "Verdana," red, and oval.

In one or more embodiments, the digital media gallery GUI 102 includes a variety of existing digital designs. The existing digital designs can comprise digital designs provided by the digital content creation/editing system, by a community of users of the digital content creation/editing system, or previous designs/images stored by the user. The user can select an existing digital design for editing in order to create a new digital design. Each of the existing designs generally includes a combination of images/videos and text, as well as other style elements (e.g., backing shapes, overlays, etc.). As will be further described below, in alternative or additional embodiments, rather than staring with an existing design, the user can create a new design that is not based on any existing image or previous digital design or manually modify an existing digital design.

In response to selecting the digital design 104 from the digital media gallery GUI 102, as shown in FIG. 1A, the digital content creation/editing system provides a digital design 140a in an editing GUI 106, as shown in FIG. 1B. Because the digital designs shown in the digital media gallery GUI 102 are available to various users of the digital content creation/editing system, in at least one embodiment, the digital content creation/editing system treats a selected digital design as a template. Thus, the digital content creation/editing system creates a digital design that is a copy of the selected digital design so that a user can edit the copy of the existing design rather than editing the original digital design. In one or more embodiments, the editing GUI 106 also includes an editing control palette 108 with one or more editing controls that enable the user to edit various design elements included in the digital design 104a. For example, controls within the editing control palette 108 allow a user to edit textual elements of a digital design including, but not limited to, the size of the displayed text, the font associated with the displayed text, the color of the displayed text, the alignment of the displayed text, the opacity of the displayed text, a backing shape associated with the displayed text, a frame associated with the displayed text, the placement or grouping of characters within the displayed text, and so forth.

In some embodiments, the user can manually edit various style elements of the digital design 104a. Alternatively, the digital content creation/editing system provides a selection of styling combinations or "mockups" that the user can select to create a new look and feel for the digital design. For example, in response to the user spinning the styling combination wheel 110 through various preset positions, the digital content creation/editing system applies various styling combinations to the digital design 104a.

As discussed above, a "styling combination" refers to a set of style attributes that the digital content creation/editing system applies to a digital design. For instance, when applied to a digital design, a styling combination related to textual elements may alter the text size, font, text color, and backing shape associated with the text in the digital design. In one or more embodiments, the styling combination wheel 110 includes ten or more preset position through which a user can spin. Accordingly, at each preset position where a user stops the styling combination wheel 110, the digital content creation/editing system applies a new styling combination to the digital design 104a.

Figure 1C:
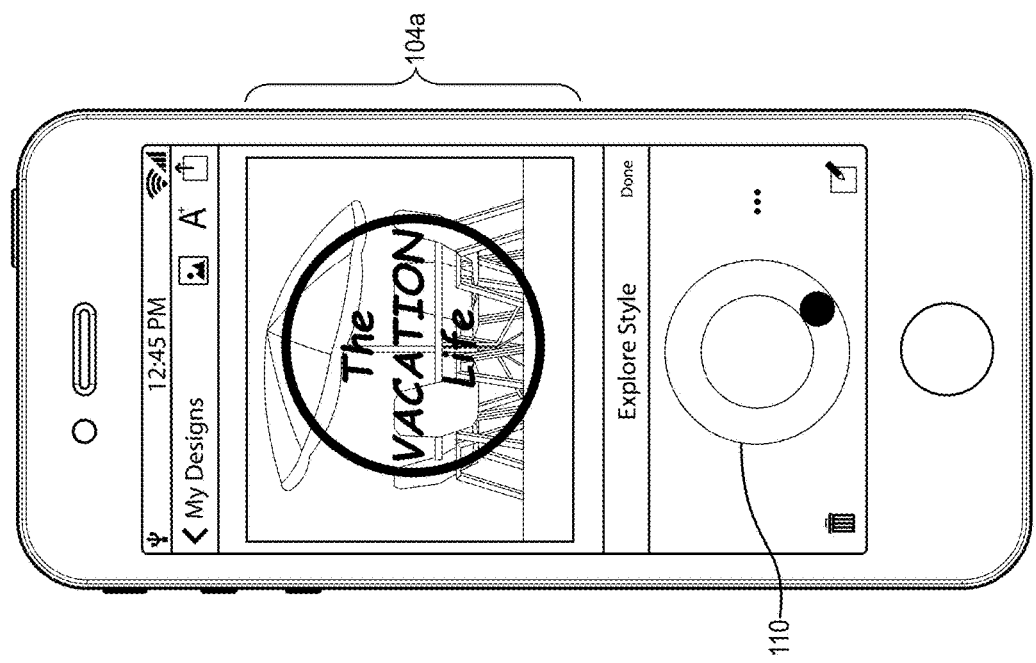

For example, as illustrated in FIG. 1C, in response to the user spinning the styling combination wheel 110 to the position shown, the digital content creation/editing system applies a styling combination to the digital design 104a that changes the font, color, size, and placement of the text in the digital design 104a. In one or more embodiments, the digital content creation/editing system applies as many styling combinations to the digital design 104a as there are preset positions on the styling combination wheel 110. In additional or alternative embodiments, the digital content creation/editing system continues to generate additional styling combinations even if the user spins the styling combination wheel 110 past the first set of preset positions on the styling combination wheel 110. Thus, the digital content creation/editing system continues to present new styling combinations as long as the user continues to spin the styling combination wheel 110, thus allowing the user to cycle through a wide selection of "looks" for the digital design 104a. Additionally, in response to the user spinning the styling combination wheel 110 in the opposite direction, the digital content creation/editing system presents the styling combinations that were previously provided.

Figure 1D:
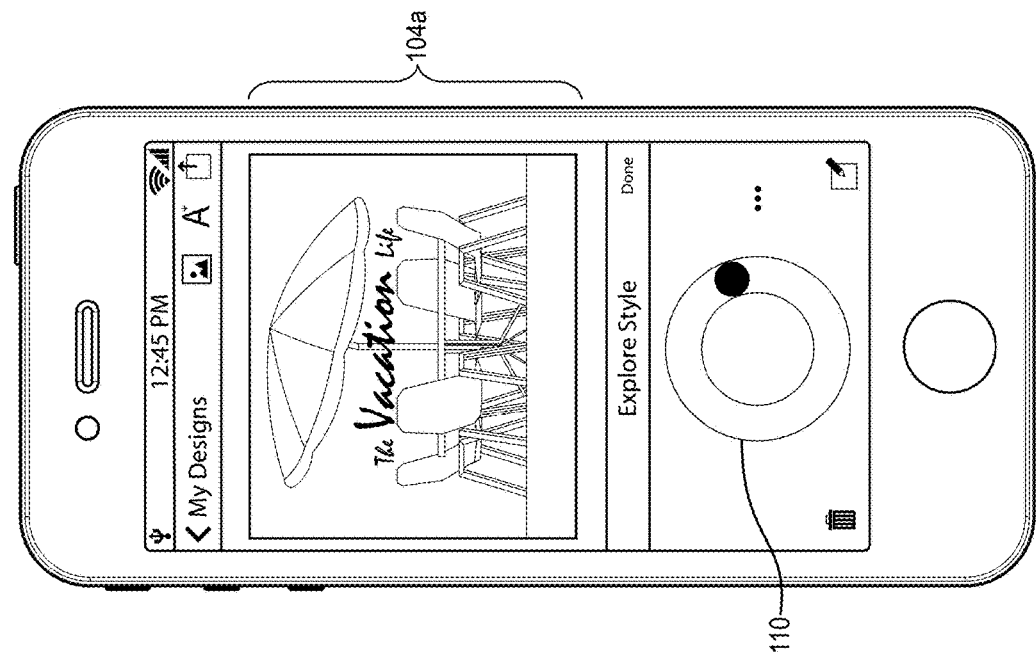
Figure 1E:
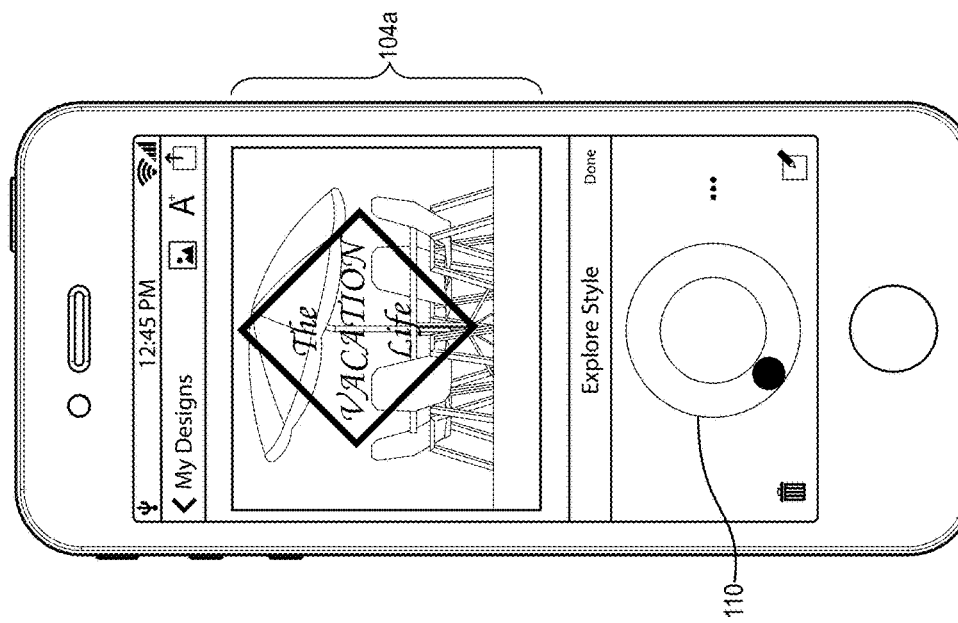

As shown in FIG. 1D, in response to the user spinning the styling combination wheel 110 from the position shown in FIG. 1C to the position shown in FIG. 1D, the digital content creation/editing system applies another styling combination to the digital design 104a that changes the font, color, size, and placement of the text in the digital design 104a. Additionally, as shown in FIG. 1E, in response to the user continuing to spin the styling combination wheel 110 to a new position, the digital content creation/editing system applies yet another styling combination to the digital design 104a that further changes the font, color, size, and placement of the text in the digital design 104a. Thus, the digital content creation/editing system allows a user to browse a variety of design combinations/effects to allow for the user to quickly make a selection that satisfies the user's needs or taste.

FIGS. 1B-1E illustrate a particular arrangement and specific tools for the editing GUI 106, styling combination wheel 110, and other tools. One will appreciate that the particular GUIs shown are example embodiments. In alternative embodiments, the GUIs and tools can differ. For example, rather than a styling combination wheel, the editing GUI 106 includes a styling combination slider, drop down menu, or other GUI control that allows a user to select or browse through a plurality of designs. Thus, the description of a styling combination wheel is for illustrative purposes and the principles described herein equally apply to other user interface controls.

In order to generate styling combinations, the digital content creation/editing system associates a seed value with a position on the styling combination wheel 110. For example, as mentioned above, the styling combination wheel 110 has a number of preset positions, where each preset position is associated with a particular styling combination, and the user can spin the styling combination wheel 110 forward and backward through the various styling combinations. Thus, by associating a seed value with a position on the styling combination wheel 110, the digital content creation/editing system ensures that the same styling combination is generated each time the user spins the styling combination wheel 110 to a particular preset position during a particular use case. In additional or alternative embodiments, the digital content creation/editing system ensures that the same styling combination is generated each time the user spins the styling combination wheel 110 to a particular present position regardless of whether the user is spinning the styling combination wheel 110 at a later time or in a different editing environment.

The digital content creation/editing system intelligently creates the various styling combinations in connection with the styling combination wheel 110 such that the styling combinations are fit to, or are otherwise appropriate relative to, the current digital design 104*a*. In particular, the digital content creation/editing system generates the styling combinations using a probabilistic selection heuristic. In one or more embodiments, the heuristic uses the current state of the digital design 104*a* as an input or argument. In other words, the digital content creation/editing system selects a combination of styling attributes and values that are appropriate for the current state of the digital design. Thus, if a user changes the underlying digital design 104*a* (e.g., by removing text, changing colors, changing an image file, etc.), the digital content creation/editing system generates a different set of styling combinations. Thus, the digital content creation/editing system generates the different set of styling combinations in combination with the styling combination wheel 110 in real time in response to a current state of the digital design 104*a*, rather than using a default set of styling combinations.

In order to select the various styling attributes and values for the styling combinations, the digital content creation/editing system uses a scoring heuristic that assigns or calculates a score or weight based on the digital design 104*a* to the possible styling values associated with each possible styling attribute. In particular, the digital content creation/editing system determines a compatibility score for each potential replacement styling value that indicates a compatibility of the potential replacement styling value with the current digital design and optionally any previously selected replacement styling values. More particularly, the digital content creation/editing system determines a compatibility score for each potential replacement styling value that indicates a compatibility of the potential replacement styling value with the current/initial digital design by determining how changing a design element in the digital design to have a given replacement styling value will effect the digital design. For example, the digital content creation/editing system can analyze one or more of proximity to other design elements, visibility of the design element, color contrast with other design elements, font similarity with other design elements, or text content of displayed text caused by the change.

For instance, if the current state of the digital design 104*a* includes the use of twelve-point text size, the digital content creation/editing system weights styling values associated with the "font size" styling attribute that are similar to or cohesive with twelve-point text size more heavily than other styling values. This helps ensure that an "appropriate" font size is selected. Along related lines, the digital content creation/editing system assigns scores styling values that are not appropriate for the digital design 104*a* with lower scores. For instance, if the underlying digital design includes a glass of red liquid over which text is applied, the digital content creation/editing system will assign red text color styling values with low scores, as red text colors will cause the text to be difficult to read. On the other hand, the digital content creation/editing system will score styling values associated with white and black with higher scores, as these colors will be easy to read over the red color of the underlying digital image. Rather than assigning compatibility scores based on existing heuristics, in at least one embodiment, the digital content creation/editing system calculates compatibility scores based on rules, grammars, instructions, neural networks, or other system input that can assist in scoring styling attributes and values.

Additionally, in determining a compatibility score for a particular styling value (e.g., a font type, a text size, a text color), the digital content creation/editing system may take into account additional factors including, but not limited to, general design principles (e.g., use of empty space, text alignment, etc.), color pairings, font pairings, visual proximity to other design elements (e.g., even if a large font textual attribute is otherwise heavily weighted, the digital content creation/editing system may not include the large font in a styling combination because the large font would block out most of the background image), and the content of the displayed text (e.g., the digital content creation/editing system may not include a flowing cursive font in a styling combination for text with shocking or graphic content). The digital content creation/editing system may utilize various algorithms, methods, databases, grammar, web lookups, etc. in order to identify general design principles, analyze design elements, and determine the content of the displayed text.

Optionally, the digital content creation/editing system scores styling values based on previously selected styling values (i.e., values in the current digital design). For example, if the text styling value included in a previously selected styling combination was "Helvetica," the digital content creation/editing system may score "Helvetica" and similar texts higher. One will appreciate in light of the disclosure herein that by assigning heavier weights to previously selected styling values, the digital content creation/editing system helps ensure that as the user spins the styling combination wheel 110, the applied styling combinations will evolve from one styling combination to the next rather than appearing as random combinations/selections.

In addition to scoring styling values based on the styling attributes and values found in the digital design 104*a*, the digital content creation/editing system weights the assigned scores based on other selected style attributes and values. For example, if the digital content creation/editing system selects black as a text color, when scoring a color for a bounding box around the text (e.g., as shown in FIG. 1B), the digital content creation/editing system can score black, or other cohesive, text colors higher.

In addition to the foregoing, the digital content creation/editing system scores styling values based on a sentiment or style associated with an underlying digital content item (e.g., image, video, illustration). In particular, the digital content creation/editing system associates a sentiment or style (e.g., peaceful, violent, excited, etc.) with each underlying digital content item and each text style. In some cases the digital content creation/editing system gathers the underlying digital content items from a system that already associates such metadata with the underlying digital content items, such as Adobe Stock. Alternatively, the digital content creation/editing system can use machine learning to discover and associate a sentiment or style with an underlying digital content item. In any event, the digital content creation/editing system assigns higher weights to styling values with similar sentiments/styles as an underlying digital content item, and lower weights to styling values that are associated with sentiments/styles that are in contrast to the sentiments/styles associated with the underlying digital content item.

Once the digital content creation/editing system determines a score for a particular styling value, the digital content creation/editing system determines whether the particular styling value is an "allowed value." In one or more embodiments, "allowed values" refer to those styling values that the digital content creation/editing system has determined score above a predetermined threshold in order to serve as potential candidates in a styling combination that can be applied to the digital design 104a (e.g., the predetermined threshold can be set by a user, or can automatically be determined by the digital content creation/editing system). The threshold score can help ensure that provided designs are aesthetically pleasing or otherwise confirm to the underlying design, image, or video.

After the digital content creation/editing system identifies all allowed styling values associated with a particular styling attribute, the digital content creation/editing system generates a probabilistically distributed set of allowed values for that particular styling attribute. In one or more embodiments, the probabilistically distributed set for a particular styling attribute ensures the probability that a particular styling value associated with the particular styling attribute will be selected is based on the compatibility score of that styling value relative to the other allowed styling values in the set.

To illustrate, the digital content creation/editing system may determine that the styling values "red," "white," "yellow," and "black," are all allowed values for the styling attribute "text color." The relative scores of these styling values, however, indicate that "black" has a high score of 9 because black is most appropriate for a particular digital design while the other colors each have a score of 1. The digital content creation/editing system uses a probabilistic selection heuristic to help insure that black is more likely to be included in an eventual, generated styling combination. In particular, the digital content creation/editing system may generate a probabilistically distributed set of twelve possible selections, where "black" occupies nine of the possible selections and the other colors occupy the remaining three selections. Thus, at selection time, "black" is much more likely to be selected from the set. In one or more embodiments, the digital content creation/editing system can generate a probabilistically distributed set for each attribute that can be applied to the digital design 104a.

In one or more embodiments, the digital content creation/editing system generates the various styling attribute combinations at run-time. In that case, at run-time, the digital content creation/editing system begins by hashing the seed value associated with the position of the styling combination wheel 110 in order to procedurally generate a non-random number (e.g., generally a positive integer). Then, for each attribute in the combination, the digital content creation/editing system uses the non-random number to select a styling value to represent the attribute from the probabilistically distributed set of allowed styling values associated with that attribute. For example, as laid out above, if the styling attribute is text color, and the generated non-random number is "3," the digital content creation/editing system assigns the styling value at the third position in the probabilistically distributed set of allowed values for the text color styling attribute to the styling combination to represent the text color styling attribute. As described above, there is a three in four chance that the assigned styling value will be "black."

The digital content creation/editing system continues using the non-random number to select a styling value to represent each styling attribute in the styling combination until every appropriate styling attribute is represented in the styling combination. Thus, the end result is a combination of styling values that can be applied to the digital design 104a based on the position of the styling combination wheel 110. While the styling combinations may appear random, the digital content creation/editing system ensures that the available styling combinations are actually dynamically determined to be "appropriate values." The digital content creation/editing system performs these same steps describe above any number of times with different seed values based on changes to the position of the styling combination wheel 110.

Figure 2B:
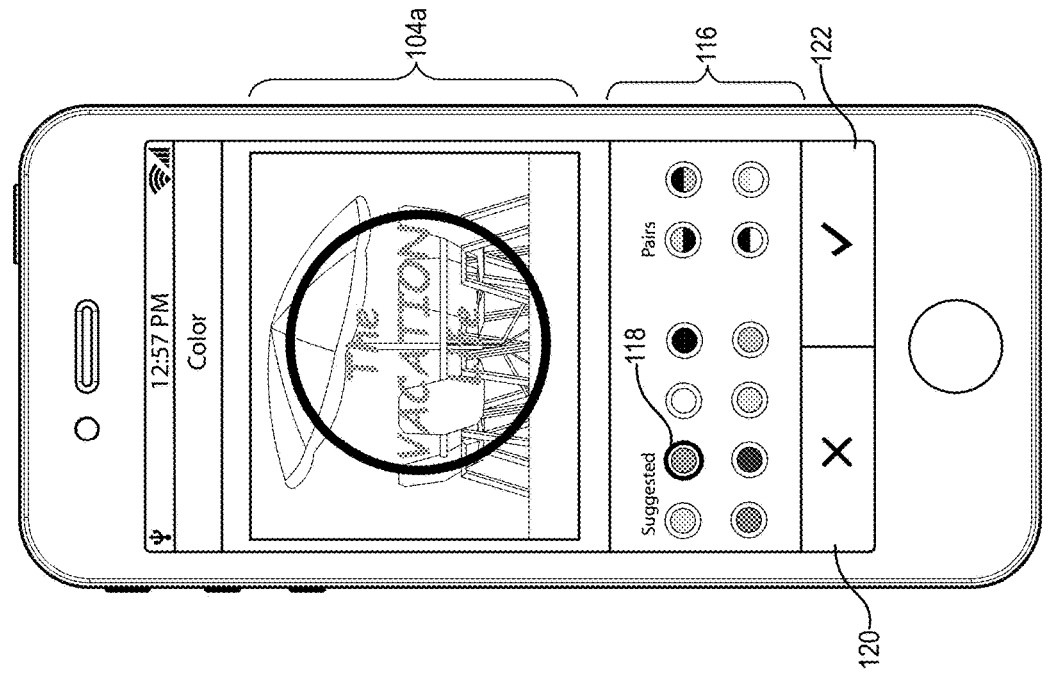
FIGS. 2A-2D illustrate another series of graphical user interfaces in connection with the digital content creation/editing system that allow for modification of digital designs in accordance with one or more embodiments.
Figure 2A:
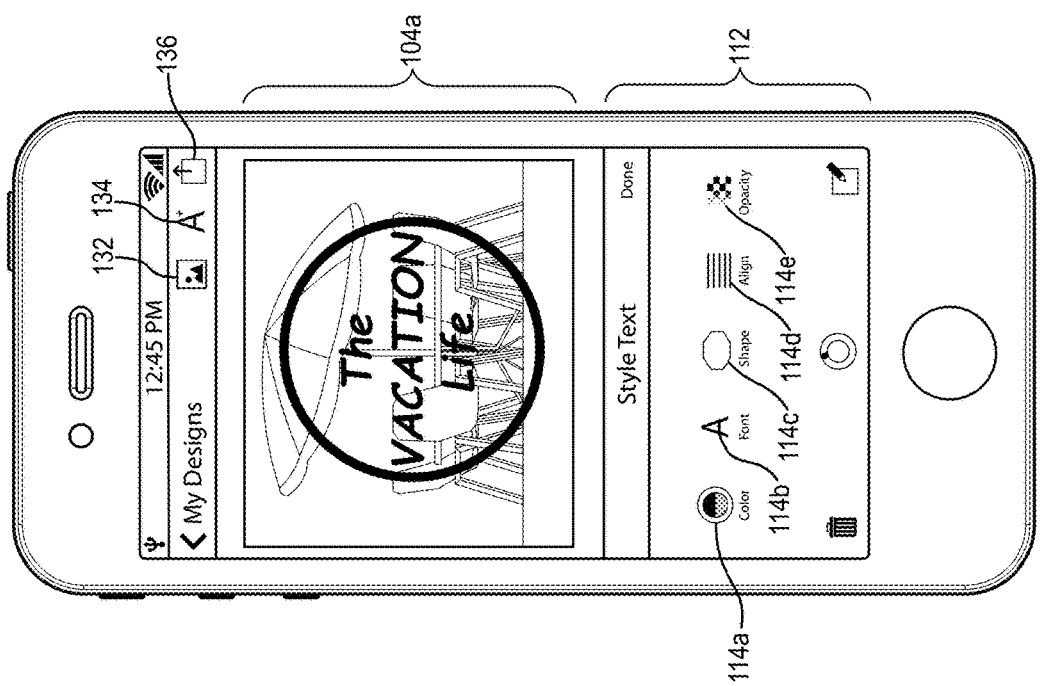

In additional or alternative embodiments, rather than presenting styling combinations for use in combination with the digital design 104a, the digital content creation/editing system enables additional controls that allow the user to manually editing the digital design 104a. For example, the digital content creation/editing system provides the manual control palette 112, as shown in FIG. 2A. In one or more embodiments, the manual control palette 112 includes a color control 114a, a font control 114b, a backing control 114c, an alignment control 114d, and an opacity control 114d.

In response to selecting the color control 114d, as shown in FIG. 2A, the user can manually edit color within the digital design 104a. In one or more embodiments, in response to the user selecting the color selection control 124, the digital content creation/editing system can provide the color palette 116, as shown in FIG. 2B. For example, the color palette 116 includes various color options that the digital content creation/editing system applies to the digital design 104a (e.g., the digital content creation/editing system may present all available colors within the color palette 116, or may only present colors that will likely be aesthetically pleasing within the digital design 104a). In some embodiments, the digital content creation/editing system applies a selected color 118 to only the text within the digital design 104a. In other embodiments, the digital content creation/editing system applies the selected color 118 to a portion of the digital design 104a indicated by the user. In at least one embodiment, in response to the user tapping the selected color 118, the digital content creation/editing system provides previews of the selected color 118 in association with the digital design 104a. If the user wants to return to the manual control palette 112 without saving any changes to the digital design 104a, as shown in FIG. 2A, the use can select the exit control 120. If the user wants to save a change to the digital design 104a, the user can select the save control 122.

Figure 2D:
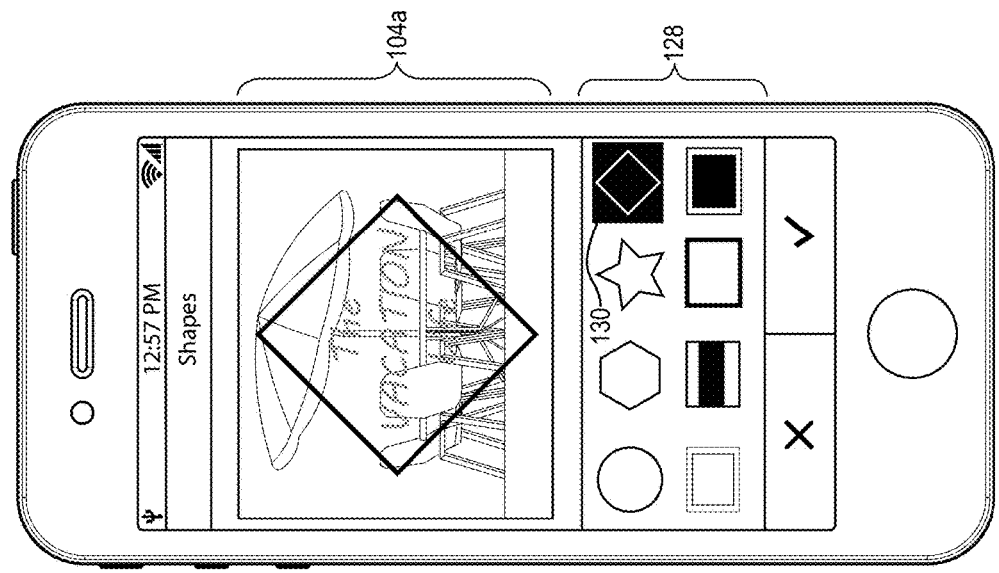
Figure 2C:
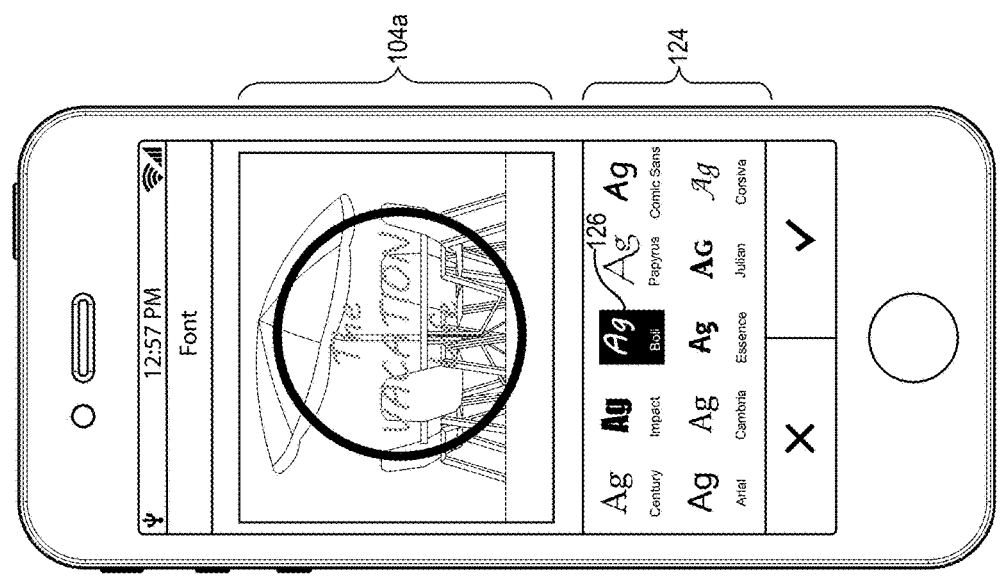

In order to manually edit the fonts shown in the digital design 104a, the user can select the font control 114a, as shown in FIG. 2A. For example, in response to the user selecting the font control 114a, as shown in FIG. 2A, the digital content creation/editing system provides the font palette 124, as shown in FIG. 2C. In one or more embodiments, the font palette 124 includes various fonts available for application to the digital design 104a. In response to the user tapping the selected font 126, the digital content creation/editing system applies the selected font 126 to the digital design 104a.

In order to manually change the backing shape shown in the digital design 104a, the user can select the backing control 114c, as shown in FIG. 2A. In response to the user selecting the backing control 114c, as shown in FIG. 2A, the digital content creation/editing system can provide the backing shape palette 128, as shown in FIG. 2D. In one or more embodiments, the backing shape palette 128 includes a variety of backing shape elements that the user can select. In response to the user selecting the backing shape 130, the digital content creation/editing system can apply the shape illustrated by the backing shape 130 to the digital design 104a. In one or more embodiments, the digital content creation/editing system automatically alters various features or characteristics of the displayed text within the digital design 104a in order for the displayed text to function cohesively with the selected backing shape. For example, in order to apply the shape illustrated by the backing shape element 116 to the digital design 104a, the digital content creation/editing system can alter the size, font, color, placement, and opacity of the text within the digital design 104, such that the text is viewable against the selected backing shape.

Furthermore, the user can manually alter the alignment of the text within the digital design 104a. In one or more embodiments, in response to the user selecting the alignment control 114d, as shown in FIG. 2A, the digital content creation/editing system alters the alignment of the text displayed in the digital design 104a. For example, the digital content creation/editing system causes the alignment of the text to become center-aligned, right-justified, left-justified, etc. In at least one embodiment, the digital content creation/editing system can cycle through different text alignments in response to the user repeatedly selecting the alignment control 114d.

Additionally, the user can manually alter the opacity of the text, or other selected elements, within the digital design 104a. In one or more embodiments, in response to the user selecting the opacity control 114e, as shown in FIG. 2A, the digital content creation/editing system can change the opacity of one or more elements within the digital design 104a. For example, the digital content creation/editing system can change the opacity of the text within the digital design 104a to become more or less opaque. In at least one embodiment, the digital content creation/editing system can cycle through various levels of opacity in response to the user repeatedly selecting the opacity control 114e. Alternatively, the digital content creation/editing system can provide a slider control in order for the user to select an opacity level in relation to the digital design 104a.

The user can further manually edit various aspects of the background portion or the textual portion of the digital design 104a by selecting the picture editing control 132 or the text editing control 134, as shown in FIG. 2A. Once the user is satisfied with the look and feel of the digital design 104a, the user can share and/or store the digital design 104a. In one or more embodiments, in response to the user selecting the sharing control 136, as shown in FIG. 2A, the digital content creation/editing system can provide various sharing options. By utilizing the various controls provided, the user can upload the digital design 104a to various social media channels, save the digital design 104a locally or remotely, print the digital design 104a, etc. In at least one embodiment, the digital content creation/editing system automatically saves the digital design 104a at regular intervals in order to save the user from accidentally loosing edits.

At anytime during the manual editing process, the user can select an option to open the editing control palette 108. Thus, the user can have the digital content creation/editing system provide styling combination based off of digital designs manually adjusted to one extent or another. This can allow the user to steer the design in a given direction while still receiving aid from the digital content creation/editing system in arriving at a final design.

Figure 3:
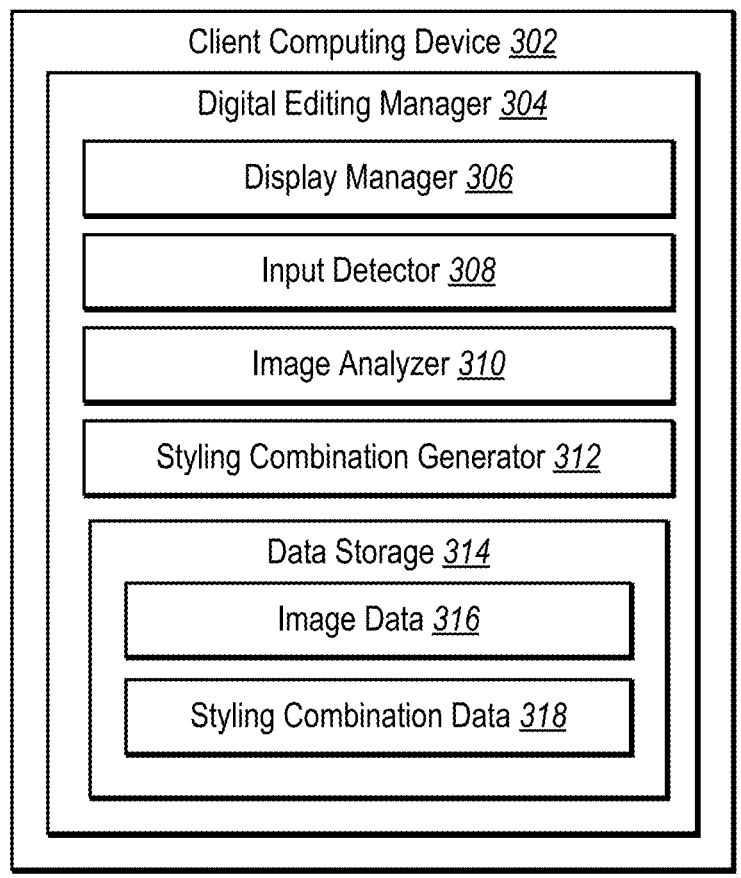
FIG. 3 illustrates a schematic diagram of the digital content creation/editing system in accordance with one or more embodiments.

FIGS. 1A-2D and their related descriptions detail the functions and features of the digital content creation/editing system with regard to a series of user interfaces with which a user can interact. FIG. 3 illustrates an example architecture for the digital content creation/editing system. For example, as shown in FIG. 3, the digital content creation/editing system includes a digital editing manager 304 installed on a client-computing device 302. In one or more embodiments, the digital editing manager 304 is a native application installed on the client-computing device 302. For instance, the digital editing manager 304 may be a mobile application that installs and runs on a client device with a touch screen, such as a smart phone or a tablet. Alternatively, the digital content creation/editing system can run on a non-touch screen enabled device.

Thus, the client-computing device 302 can be any type of computing device (e.g., a desktop or laptop), but is preferably a handheld device such as a smart phone, a tablet, a personal digital assistant, a smart wearable (e.g., a smart watch or enhanced eyewear), etc. In additional or alternative embodiments, the digital editing manager 304 is a desktop application, widget, or other form of a native computer program. Alternatively, the digital editing manager 304 may be a remote application accessed by the client-computing device 302 over a network, or may be a web application that is executed with a web browser of the client-computing device 302.

As shown in FIG. 3, the digital editing manager 304 includes, but is not limited to, a display manager 306, an input detector 308, an image analyzer 310, a styling combination generator 312, and a data storage 314. In one or more embodiments, the components 304-314 comprise software, hardware, or both. For example, the components 304-314 can comprise computing instructions stored on a non-transitory computer-readable storage medium and executable by at least one processor of the client-computing device 302. When executed by the at least one processor, the computing-executable instructions cause the client-computing device 302 to perform the methods and processes described herein. Alternatively, the components 304-314 can comprise hardware, such as a special purpose processing device to perform a certain function or group of functions. Additionally or alternatively, the components 304-314 can comprise a combination of computer-executable instructions and hardware.

As mentioned above, and as shown in FIG. 3, the digital editing manager 304 includes a display manager 306. The display manager 306 provides, manages, and/or controls a graphical user interface (or simply "user interface") that allows a user to edit digital images. For example, the display manager 306 provides a user interface that facilitates interactions with a display. Likewise, the display manager 306 provides a user interface that displays information provided by other components 308-314 of the digital editing manager 304.

More specifically, the display manager 306 facilitates the display of a user interface (e.g., by way of a display device associated with the client-computing device 302). For example, the user interface is composed of a plurality of graphical components, objects, and/or elements that allow a user to interact with the digital editing manager 304. More particularly, the display manager 306 directs the client-computing device 302 to display a group of graphical components, objects, and/or elements as directed by the digital editing manager 304.

As further illustrated in FIG. 3, the digital editing manager 304 includes an input detector 308. In one or more embodiments, the input detector 308 detects, receives, and/or facilitates user input in any suitable manner. In some examples, the input detector 308 detects one or more user interactions with respect to the user interface. As referred to herein, a "user interaction" means a single interaction, or combination of interactions, received from a user by way of one or more input devices.

For example, the input detector 306 detects a user interaction from a keyboard, mouse, touch pad, touch screen, and/or any other input device. In the event the client-computing device 302 includes a touch screen, the input detector 308 detects one or more touch gestures (e.g., swipe gestures, tap gestures, pinch gestures, or reverse pinch gestures, etc.) from a user that forms a user interaction. In some examples, a user provides the touch gestures in relation to and/or directed at one or more graphical objects or graphical elements of a user interface.

The input detector 308 may additionally, or alternatively, receive data representative of a user interaction. For example, the input detector 308 receives one or more user configurable parameters from a user, one or more user commands from the user, and/or any other suitable user input. The input detector 308 may also receive input data from one or more components of the digital editing manager 304.

The digital editing manager 304 performs one or more functions in response to the input detector 308 detecting user input and/or receiving other data. Generally, a user can control, navigate, and otherwise use the digital editing manager 304 by providing one or more user inputs that the input detector 308 can detect. For example, in response to the input detector 308 detecting user input, the display manager 306 allows the user to view data, interact with various controls, or edit digital images. In addition, in response to the input detector 308 detecting user input, the display manager 306 allows a user to navigate through one or more user interfaces to view, edit, save, and share a digital image. For example, a user may provide input (e.g., via a button click, a list item selection, a drag-and-drop, etc.) indicating an edit to a digital image. In response to the input detector 308 detecting the input, the digital editing manager 304 takes appropriate action in response to the detected user input.

As shown in FIG. 3, the digital editing manager 304 also includes an image analyzer 310. As discussed above, the digital content creation/editing system determines scores for various styling attributes and values based on the styling attributes and values of an underlying digital design. Accordingly, in one or more embodiments, the image analyzer 310 analyzes a digital design in order to identify one or more styling attributes and associated styling values within the digital design.

Additionally, the image analyzer 310 also analyzes other aspects of a digital design for use in scoring styling attributes and values. For example, the image analyzer 310 analyzes a digital design for a particular sentiment or style (e.g., peaceful, violent, excited, etc.). Also, the image analyzer 310 analyzes the digital design for additional metadata, etc. that may not be classified as a styling attribute or styling value. Furthermore, the image analyzer 310 identifies previously scored styling values in relation to the digital design. Thus, the image analyzer 310 analyzes the digital design for any information that can be used by a scoring heuristic, as described above.

In one or more embodiments, the image analyzer 310 applies the scoring heuristic to a plurality of possible styling attributes and styling values. As described above, the digital content creation/editing system utilizes the scoring heuristic in order to determine a score for possible styling attributes and styling values that might be included in one or more styling combinations. Accordingly, the image analyzer 310 utilizes the scoring heuristic in order to identify a plurality of styling values that are "allowed values," as described above.

As mentioned above with reference to FIG. 1B, the display manager 306 can provide an editing GUI 106 that includes a styling combination wheel 110. Also as described above, by the spinning the styling combination wheel 110 through various preset positions, the digital content creation/editing system can apply various styling combination to the digital design 104*a*. As shown in FIG. 3, the digital editing manager 304 includes the styling combination generator 312. In one or more embodiments, the styling combination generator 312 generates a probabilistically distributed set of "allowed" styling values for each of a plurality of styling attributes. As described above, the styling combination generator 312 generates each probabilistically distributed set of allowed styling values so as to ensure the probability that a particular styling value associated with a particular styling attribute will be selected is based on the score of that styling value relative to the other allowed styling values in the set.

The styling combination generator 314 also creates a seed value based on the position of the styling combination wheel 110. As described above, in response to a user spinning the styling combination wheel 110, the styling combination generator 314 hashes the seed value based on the position of the styling combination wheel 110. Thus, the styling combination generator 314 ensures that each position of the styling combination wheel 110 is associated with a unique seed value, even if the styling combination wheel 110 is spun past its starting position. In one or more embodiments, each seed value is a non-random, positive integer.

The styling combination generator 314 also generates styling combinations of styling values associated with a plurality of styling attributes, based on a seed value. For example, as described above, in response to the user spinning the styling combination wheel 110 to a particular position, the styling combination generator 314 utilizes the seed value associated with the particular position to select a styling value from each of the plurality of probabilistically distributed sets of allowed styling values. Thus, based on the seed value, the styling combination generator 314 generates a single combination of styling values, where each styling value is associated with a single styling attribute.

Furthermore, the styling combination generator 314, in association with the display manager 306, applies a selected styling combination to a digital design. In one or more embodiments, the styling combination generator 314 applies a selected styling combination to a digital design by changing the identified styling values within the digital design to the corresponding styling values in the selected styling combination. For example, a digital design includes following styling values: black text color, Helvetica font, and twelve-point text size. The selected styling combination includes styling values: blue text color, Times New Roman font, and 14-point text size. In this case, the styling combination generator 314 will change the identified styling values in the digital design to match the styling values included in the selected styling combination.

Also as mentioned above, and as illustrated in FIG. 3, the digital editing manager 304 includes a data storage 314. The data storage 314 can store and maintain image data 316 and styling combination data 318. In one or more embodiments, the image data 316 is representative of image information, such as described herein. Also, in one or more embodiments, the styling combination data 318 is representative of styling combination information, such as described herein.

Figure 4:
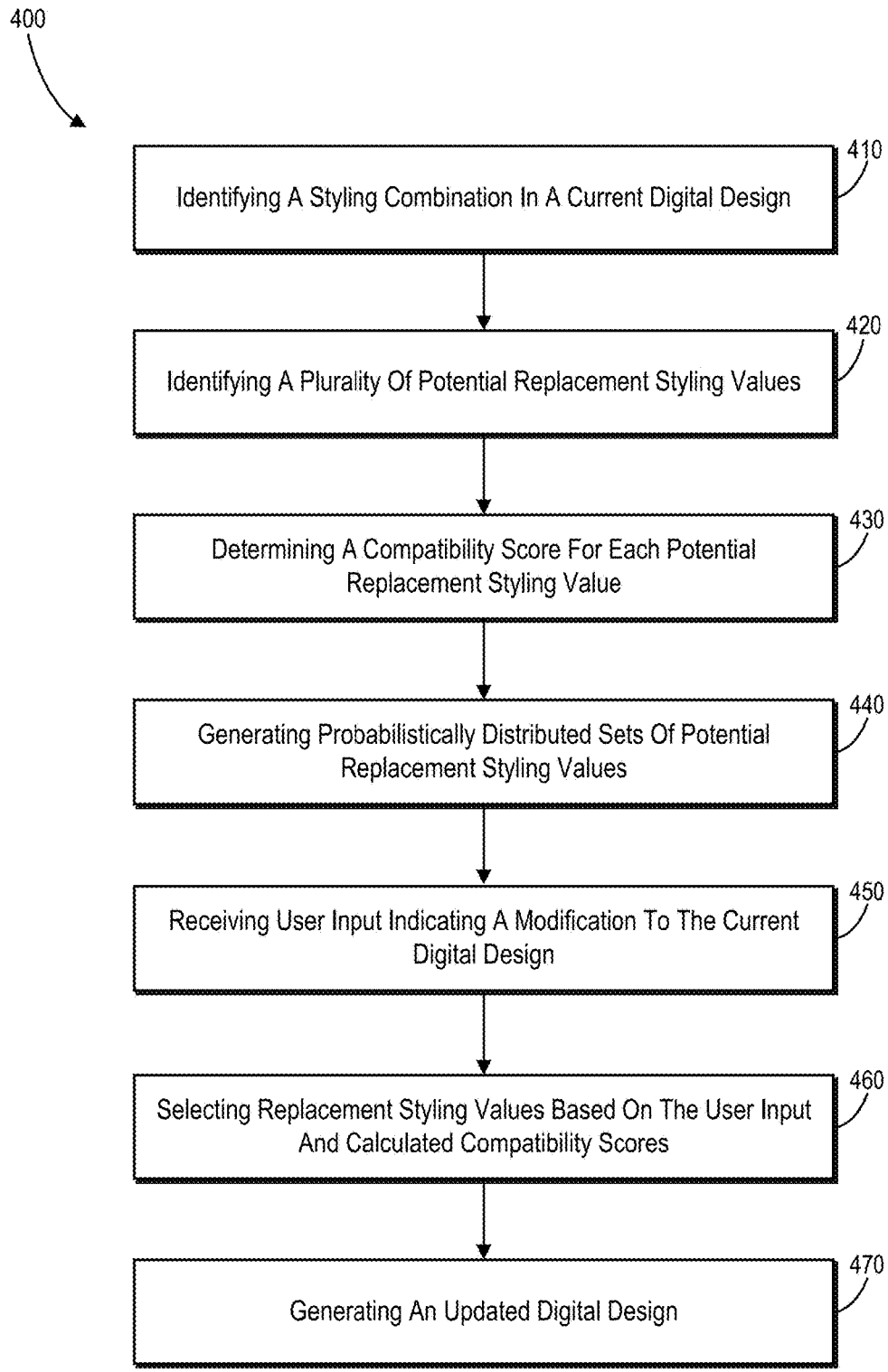
FIG. 4 illustrates a flowchart of a series of acts in a method of procedurally generating sets of probabilistically distributed styling values and styling combinations in accordance with one or more embodiments.

FIGS. 1A-3, the corresponding text, and the examples provide a number of different methods, systems, and devices for procedurally generating sets of probabilistically distributed styling values and styling combinations. In addition to the foregoing, embodiments can also be described in terms of flowcharts comprising acts and steps in a method for accomplishing a particular result. For example, FIG. 4 illustrates a flowchart illustrating acts and steps in a method of procedurally generating sets of probabilistically distributed styling values and styling combinations. One will appreciate in light of the disclosure herein that the method may be performed with less or more steps/acts or the steps/acts may be performed in differing orders. Additionally, the steps/acts described herein may be repeated or performed in parallel with one another or in parallel with different instances of the same or similar steps/acts.

FIG. 4 illustrates a flowchart of one example method 400 of procedurally generating sets of probabilistically distributed styling values and styling combinations. The method 400 includes an act 410 of identifying a styling combination in a current digital design. In particular, the act 410 involves identifying, in a current digital design (e.g., the digital design 104a as shown in FIG. 1B), a current styling combination including a plurality of styling attributes each having a current styling value.

The method 400 also includes an act 420 of identifying a plurality of potential replacement styling values. In particular, the act 420 involves identifying a plurality of potential replacement styling values for each attribute of the plurality of styling attributes. In one or more embodiments, identifying a plurality of potential replacement styling values includes performing database lookups, performing Internet searches, and analyzing past searches and search results.

Further, the method 400 includes an act 430 of determining a compatibility score for each potential replacement styling value. In particular, the act 430 involves determining a compatibility score for each potential replacement styling value that indicates a compatibility of the potential replacement styling value with the current digital design and any previously selected replacement styling values. For example, determining a compatibility score for each potential replacement styling value includes determining how changing a design element in the digital design to have a given replacement styling value will effect other various design elements within the digital design. In one or more embodiments, the method 400 further includes acts of receiving user input modifying a styling value (e.g., via any of the controls illustrated in FIGS. 2A-2D), and updating the compatibility scores based on the received user input.

Additionally, the method 400 includes an act 440 of receiving user input indicating a modification to the current digital design. In particular, the act 440 involves receiving user input indicating a selected position of a graphical user interface control (e.g., the styling combination wheel 110 as shown in FIGS. 1B-1E) for modifying the current digital design. For example, receiving user input in association with the graphical user interface control includes receiving a selected position of a rotatable user interface control.

The method 400 also includes an act 450 of generating probabilistically distributed sets of potential replacement styling values. In particular, the act 450 involves generating, based on the determined compatibility score for each potential replacement styling value, one or more probabilistically distributed sets of potential replacement styling values for each styling attribute. In some embodiments, the method 400 also includes an act of generating, based on the selected position of the graphical user interface control, a seed value including a unique non-random number. In that case, generating, based on the determined compatibility score for each potential replacement styling value, one or more probabilistically distributed sets of potential replacement styling values for each styling attribute includes weighting each potential replacement styling value such that a probability that a given potential replacement styling value will be selected is based on the compatibility score of the given potential replacement styling value compared to the compatibility scores of the other potential replacement styling values within the probabilistically distributed set.

The method 400 also includes an act 460 of selecting replacement styling values based on the user input and calculated compatibility scores. In particular, the act 460 involves selecting replacement styling values from the one or more probabilistically distributed sets of potential replacement styling values for one or more of the current styling values based on the user input and the determined compatibility scores. For example, selecting replacement styling values for one or more of the current styling values based on the user input and the determined compatibility scores includes using the non-random number to select replacement styling values from the probabilistically distributed sets of potential replacement styling values.

The method 400 also includes an act 470 of generating an updated digital design. In particular, the act 470 involves generating an updated digital design by replacing the current styling values with the selected replacement styling values (e.g., as illustrated by the digital design 104a as shown in FIGS. 1C, 1D, and 1E). In some embodiments, the method 400 also includes generating updated digital designs each time the graphical user interface control is moved to a new position (e.g., as shown in FIGS. 1B, 1C, 1D, and 1E). In that case, the method 400 further includes associating selected replacement styling values of a given updated digital design with a corresponding seed value such that each time the graphical user interface control is moved into a given position associated with a seed value, the corresponding updated digital design is provided.

Figure 5:
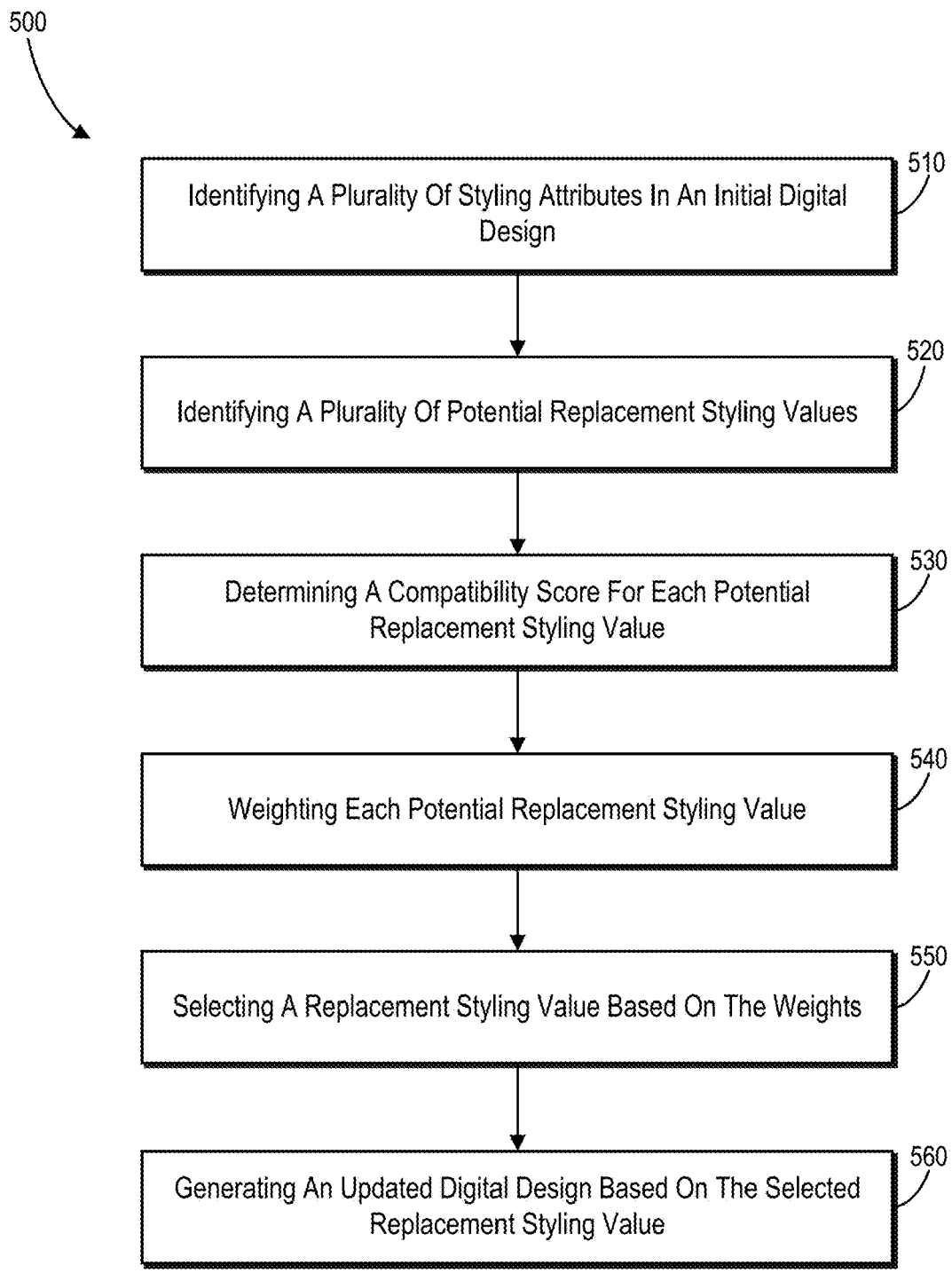
FIG. 5 illustrates another flowchart of a series of acts in a method of procedurally generating sets of probabilistically distributed styling values and styling combinations in accordance with one or more embodiments.

FIG. 5 illustrates a flowchart of another example method 500 of procedurally generating sets of probabilistically distributed styling values and styling combinations. The method 500 includes an act 510 of identifying a plurality of styling attributes in an initial digital design. In particular, the act 510 involves identifying, in an initial digital design (e.g., the digital design 104a as shown in FIG. 1B), a plurality of styling attributes each having an initial styling value.

The method 500 also includes an act 520 of identifying a plurality of potential replacement styling values. In particular, the act 520 involves identifying a plurality of potential replacement styling values for a first styling attribute of the plurality of styling attributes. In one or more embodiments, identifying a plurality of potential replacement styling values for the first styling attribute includes performing database lookups, performing Internet searches, and analyzing past searches and search results performed by the digital content creation/editing system.

Additionally, the method 500 includes an act 530 of determining a compatibility score for each potential replacement styling value. In particular, the act 530 involves determining a compatibility score for each potential replacement styling value for the first styling attribute that indicates a compatibility of the potential replacement styling value with the initial digital design. For example, determining a compatibility score for each potential replacement styling value that indicates a compatibility of the potential replacement styling value with the initial digital design includes determining how changing a design element in the digital design to have a given replacement styling value will effect one or more of proximity to other design elements, visibility of the design element, color contrast with other design elements, font similarity with other design elements, or text content of displayed text.

The method 500 further includes an act 540 of weighting each potential replacement styling value for the first styling attribute. In particular, the act 540 involves weighting, based on the determined compatibility score for each potential replacement styling value for the first styling attribute, each potential replacement styling value for the first styling attribute. In at least one embodiment, weighting each potential replacement styling value includes determining a probability that a given potential replacement styling value will be selected is based on the compatibility score of the given potential replacement styling value compared to the compared to the compatibility scores of the other potential replacement styling values within the probabilistically distributed set.

Furthermore, the method 500 includes an act 550 of selecting a replacement styling value based on the weights. In particular, the act 550 involves selecting, based on the weights for each potential replacement styling value for the first styling attribute, a replacement styling value for the first styling attribute. In one or more embodiments, selecting a replacement styling value for the first styling attribute includes selecting a replacement styling value with the highest determined compatibility score.

The method 500 also includes an act 560 of generating an updated digital design by replacing the initial styling value for the first styling attribute of the digital design with the selected replacement styling value for the first styling attribute (e.g., as illustrated in the digital design 104a in any of FIG. 1C, 1D, or 1E). In one or more embodiments, the digital content creation/editing system continues this process for every styling attribute identified in the digital design, until all styling values in the digital design have been replaced.

The method 500 further includes an act of generating a probabilistically distributed set of potential replacement styling values for the first styling attribute, wherein the replacement styling value for the first styling attribute is selected from the probabilistically distributed set of weighted potential replacement styling values. In at least one embodiment, weighting each potential replacement styling value includes determining a probability that a given potential replacement styling value will be selected is based on the compatibility score of the given potential replacement styling value compared to the compatibility scores of the other potential replacement styling values within the probabilistically distributed set. In at least one embodiment, the method 500 also includes acts of identifying potential replacement styling values with a compatibility score below a predetermined threshold, and excluding the identified potential replacement styling values with compatibility scores below the predetermined threshold from the probabilistically distributed set of potential replacement styling values.

In one or more embodiments, the act 550 of selecting, based on the weights, a replacement styling value for the first styling attribute of the plurality of styling attributes includes identifying a graphical interface control position based on user manipulation of a graphical interface control (e.g., the styling combination wheel 110 as shown in FIGS. 1B-1E), and using the seed value to select the replacement styling value from the probabilistically distributed set of potential replacement styling values. Additionally, in at least one embodiment, the method 500 includes an act of performing a hash of the graphical interface control position to generate a seed value and using the seed value to select the replacement styling value from the probabilistically distributed set of potential replacement styling values.

In one or more embodiments, the method 500 further includes an act of determining a compatibility score for each potential replacement styling value for a second styling attribute that indicates a compatibility of the potential replacement styling value with the initial digital design and the selected replacement styling value for the first styling attribute. For example, the method 500 also includes selecting, based on the determined compatibility scores for each potential replacement styling value for the second styling attribute, a replacement styling value for the second styling attribute, and replacing the initial styling value for the second styling attribute of the digital design with the selected replacement styling value for the second styling attribute.

In at least one embodiment, the method 500 includes an act of determining an updated compatibility score for each potential replacement styling value for the first styling attribute that indicates a compatibility of the potential replacement styling value with the updated digital design. In that case, the method 500 further includes selecting, based on the determined updated compatibility scores for each potential replacement styling value for the first styling attribute, an updated replacement styling value for the first styling attribute. Finally, the method 500 includes generating another updated digital design by replacing the selected replacement styling value for the first styling attribute of the updated digital design with the selected updated replacement styling value (e.g., as shown between the digital design 104a in FIG. 1C and the digital design 104a in FIG. 1D).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, watches, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
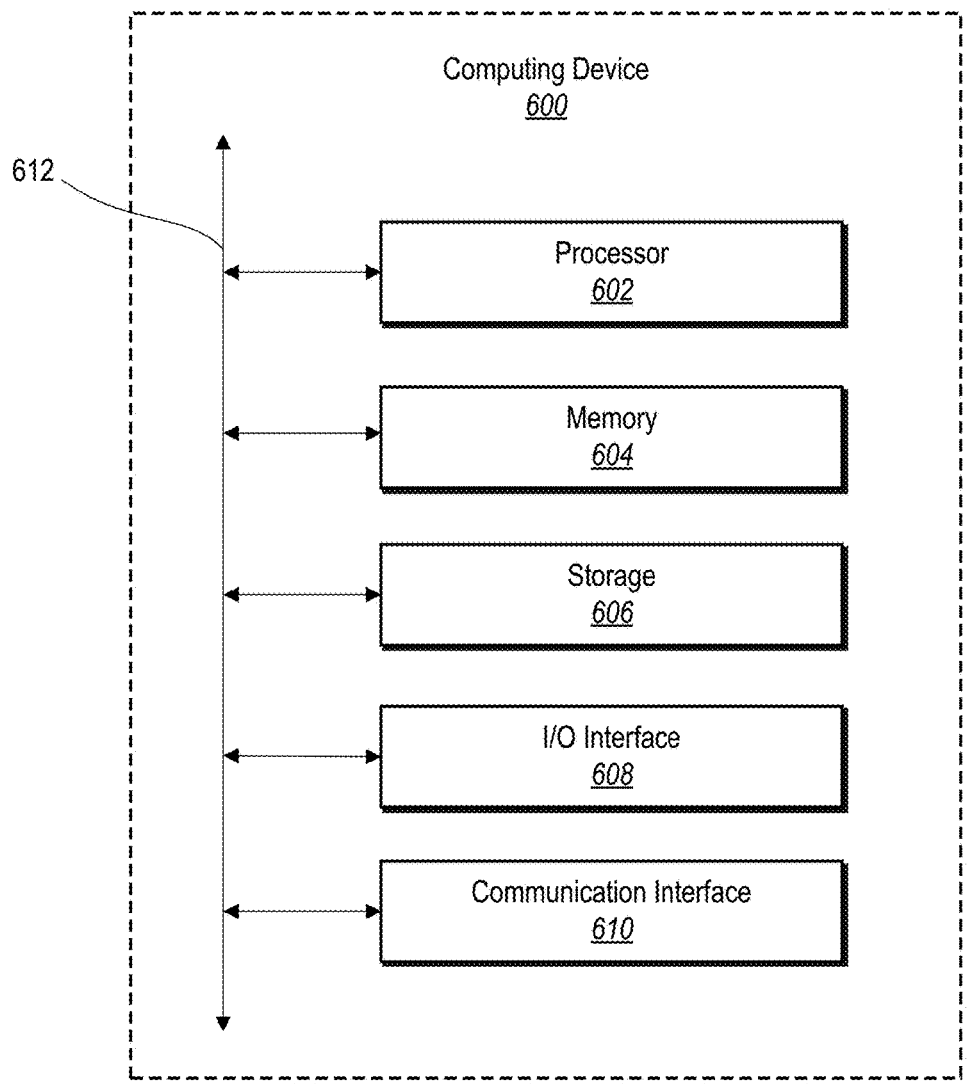
FIG. 6 illustrates a block diagram of an exemplary computing device in accordance with one or more embodiments.

FIG. 6 illustrates a block diagram of an exemplary computing device 600 that may be configured to perform one or more of the processes described above. One will appreciate that one or more computing devices such as the computing device 600 may implement the digital content creation/editing system. As shown by FIG. 6, the computing device 600 can comprise a processor 602, memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In particular embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In particular embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, the storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In particular embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from the computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications via various communication protocols. Examples of communication protocols that may be used include, but are not limited to, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML"), JavaScript Object Notation ("JSON"), and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 7:
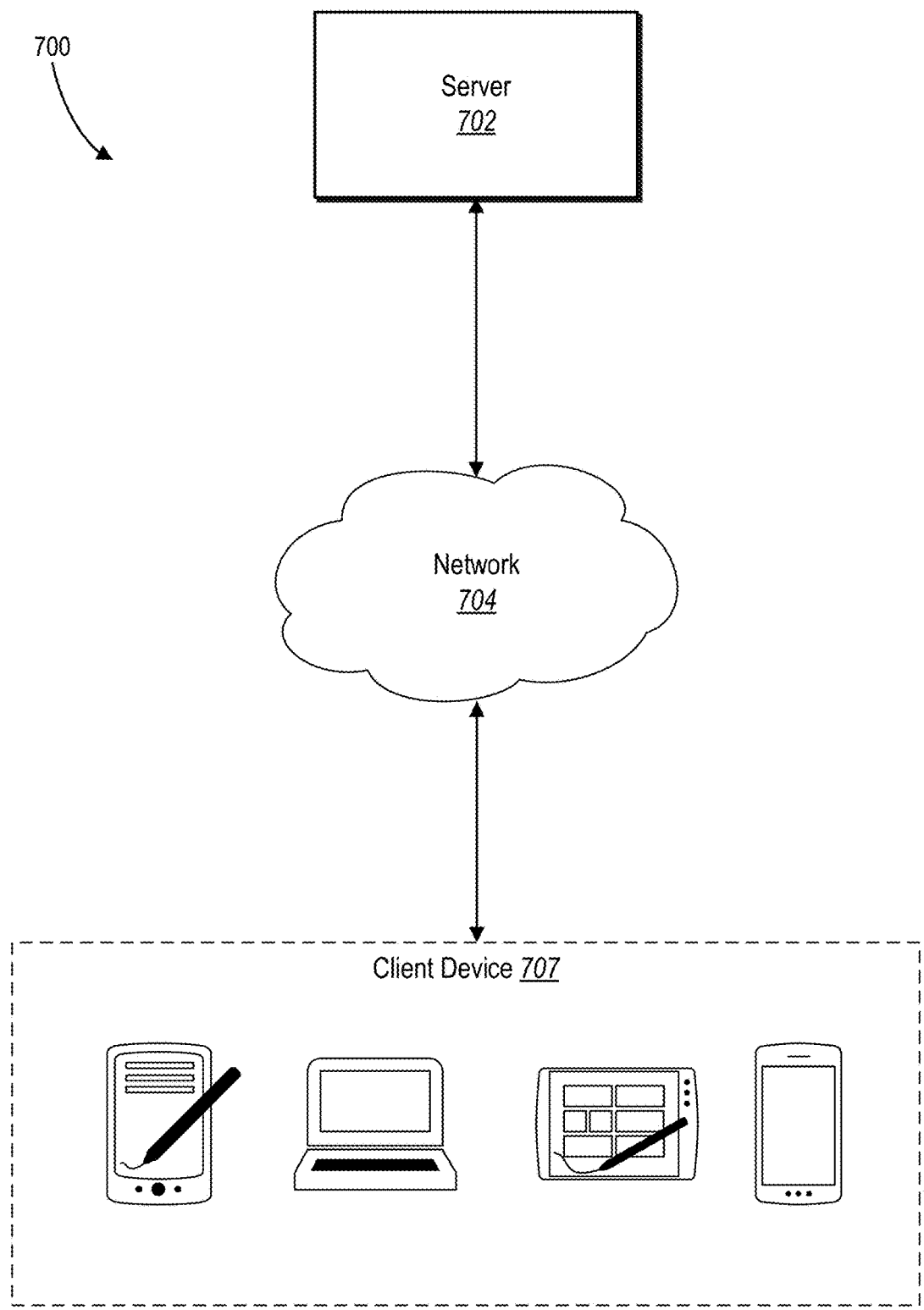
FIG. 7 is an example network environment in which the digital content creation/editing system can operate in accordance with one or more embodiments.

FIG. 7 illustrates an example network environment 700 of in which the server 304 can operate. The network environment 700 includes a client system 706, and a server 702 connected to each other by a network 704. Although FIG. 7 illustrates a particular arrangement of the client system 706, the server 702, and the network 704, this disclosure contemplates any suitable arrangement of the client system 706, the server 702, and the network 704. As an example and not by way of limitation, the client system 706 and the server 702 may be connected to each other directly, bypassing network 704. As another example, the client system 706 and the server 702 may be physically or logically co-located with each other in whole or in part. Moreover, although FIG. 7 illustrates a particular number of client systems 706, servers 702, and networks 704, this disclosure contemplates any suitable number of client systems 706, servers 702, and networks 704. As an example and not by way of limitation, network environment 700 may include multiple client system 706, servers 702, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client system 706 and the server 702 to the communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client system 706 may be an electronic device including hardware, software, or embedded logic components or a combination of two or more such components and capable of carrying out the appropriate functionalities implemented or supported by client system 706. As an example and not by way of limitation, a client system 706 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 706. A client system 706 may enable a network user at client system 706 to access network 704. A client system 706 may enable its user to communicate with other users at other client systems 706.

In particular embodiments, client system 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 706 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 706 one or more Hyper Text Markup Language (HTML) files responsive to the HTTP request. Client system 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server 702 may be capable of linking a variety of entities. As an example and not by way of limitation, server 702 may enable users to interact with each other as well as receive content from third-party systems or other entities, or to allow users to interact with these entities through an application programming interfaces (API) or other communication channels.

In particular embodiments, a third-party system may include one or more types of servers, one or more data stores, one or more interfaces, including but not limited to APIs, one or more web services, one or more content sources, one or more networks, or any other suitable components, e.g., that servers may communicate with. A third-party system may be operated by a different entity from an entity operating the server 702. In particular embodiments, however, the server 702 and third-party systems may operate in conjunction with each other to provide analytics services to users of the server 702 or third-party systems. In this sense, server 702 may provide a platform, or backbone, which other systems, such as third-party systems, may use to provide analytic or data/tracking services and functionality to users across the Internet.

In particular embodiments, a third-party system may include a third-party content object provider. A third-party content object provider may include one or more sources of content objects, which may be communicated to a client system 706. As an example and not by way of limitation, content objects may include information regarding things of interest to the user, such as, for example, digital media, digital designs, digital photographs, digital videos, digital audio, clip art, fonts, etc. As another example and not by way of limitation, content objects may include metadata that describes the content objects.

In particular embodiments, server 702 may include a variety of servers, sub-systems, programs, modules, logs, and data stores. In particular embodiments, server 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server 702 may also include suitable components such as network interfaces, security mechanisms, load balancers, failover servers, management-and-network-operations consoles, other suitable components, or any suitable combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for generating and modifying digital media, a method for generating styling combinations for an input design comprising:
 identifying, in a current digital design, a current styling combination including a plurality of styling attributes each having a current styling value;

identifying a plurality of potential replacement styling values for each attribute of the plurality of styling attributes;
determining a compatibility score for each potential replacement styling value that indicates a compatibility of the potential replacement styling value with the current digital design and any previously selected replacement styling values;
generating, based on the determined compatibility score for each potential replacement styling value, one or more probabilistically distributed sets of potential replacement styling values for each styling attribute;
receiving user input indicating a selected position of a graphical user interface control for modifying the current digital design;
selecting replacement styling values from the one or more probabilistically distributed sets of potential replacement styling values for one or more of the current styling values based on the user input and the determined compatibility scores;
applying the selected replacement styling values to the digital design to generate an updated digital design by changing the current styling values to match the selected replacement styling values; and
generating updated digital designs each time the graphical user interface control is moved to a new position.

2. The method as recited in claim 1, wherein receiving user input in association with the graphical user interface control comprises receiving a selected position of a rotatable user interface control.

3. The method as recited in claim 1, further comprising generating, based on the selected position of the graphical user interface control, a seed value comprising a unique non-random number.

4. The method as recited in claim 3, wherein generating, based on the determined compatibility score for each potential replacement styling value, one or more probabilistically distributed sets of potential replacement styling values for each styling attribute comprises weighting each potential replacement styling value such that a probability that a given potential replacement styling value will be selected is based on the compatibility score of the given potential replacement styling value compared to the compatibility scores of the other potential replacement styling values within the probabilistically distributed set.

5. The method as recited in claim 4, wherein selecting replacement styling values from the one or more probabilistically distributed sets of potential replacement styling values for one or more of the current styling values based on the user input and the determined compatibility scores comprises using the non-random number to select replacement styling values from the one or more probabilistically distributed sets of potential replacement styling values.

6. The method as recited in claim 1, further comprising associating selected replacement styling values of a given updated digital design with a corresponding seed value such that each time the graphical user interface control is moved into a given position associated with a seed value, the corresponding updated digital design is provided.

7. The method as recited in claim 1, further comprising:
receiving user input modifying a styling value; and
updating the compatibility scores based on the received user input.

8. A non-transitory computer-readable storage medium storing instructions thereon that, when executed by at least one processor, cause a system to:

identify, in an initial digital design, a plurality of styling attributes each having an initial styling value;
identify a plurality of potential replacement styling values for a first styling attribute of the plurality of styling attributes;
determine a compatibility score for each potential replacement styling value for the first styling attribute that indicates a compatibility of the potential replacement styling value with the initial digital design by determining how changing a design element in the digital design to have a given replacement styling value will effect one or more of: proximity to other design elements, visibility of the design element, color contrast with other design elements, font similarity with other design elements, or text content of displayed text;
weight, based on the determined compatibility score for each potential replacement styling value for the first styling attribute, each potential replacement styling value for the first styling attribute;
select, based on the weights for each potential replacement styling value for the first styling attribute, a replacement styling value for the first styling attribute; and
apply the selected replacement styling value to the digital design to generate an updated digital design by changing the initial styling value for the first styling attribute of the digital design to match the selected replacement styling value for the first styling attribute.

9. The non-transitory computer-readable storage medium as recited in claim 8, further storing instructions thereon that, when executed by the at least one processor, cause the system to generate a probabilistically distributed set of potential replacement styling values for the first styling attribute, wherein the replacement styling value for the first styling attribute is selected from the probabilistically distributed set of potential replacement styling values.

10. The non-transitory computer-readable storage medium as recited in claim 9, further storing instructions thereon that, when executed by the at least one processor, cause the system to:
identify potential replacement styling values with a compatibility score below a predetermined threshold; and
exclude the identified potential replacement styling values with compatibility scores below the predetermined threshold from the probabilistically distributed set of potential replacement styling values.

11. The non-transitory computer-readable storage medium as recited in claim 9, wherein the instructions, when executed by the at least one processor, cause the system to weight each potential replacement styling value by determining a probability that a given potential replacement styling value will be selected is based on the compatibility score of the given potential replacement styling value compared to the compatibility scores of the other potential replacement styling values within the probabilistically distributed set.

12. The non-transitory computer-readable storage medium as recited in claim 11, wherein the instructions, when executed by the at least one processor, cause the system to select, based on the weights for each potential replacement styling value for the first styling attribute, a replacement styling value for the first styling attribute of the plurality of styling attributes based on:
identifying a graphical interface control position based on user manipulation of a graphical interface control; and using a seed value to select the replacement styling value from the probabilistically distributed set of potential replacement styling values.

13. The non-transitory computer-readable storage medium as recited in claim 12, further storing instructions thereon that, when executed by the at least one processor, cause the system to perform a hash of the graphical interface control position to generate a seed value and using the seed value to select the replacement styling value from the probabilistically distributed set of potential replacement styling values.

14. The non-transitory computer-readable storage medium as recited in claim 8, further storing instructions thereon that, when executed by the at least one processor, cause the system to determine a compatibility score for each potential replacement styling value for a second styling attribute that indicates a compatibility of the potential replacement styling value with the initial digital design and the selected replacement styling value for the first styling attribute.

15. The non-transitory computer-readable storage medium as recited in claim 14, further storing instructions thereon that, when executed by the at least one processor, cause the system to:
select, based on the determined compatibility scores for each potential replacement styling value for the second styling attribute, a replacement styling value for the second styling attribute; and
replace the initial styling value for the second styling attribute of the digital design with the selected replacement styling value for the second styling attribute.

16. The non-transitory computer-readable storage medium as recited in claim 8, further storing instructions thereon that, when executed by the at least one processor, cause the system to:
determine an updated compatibility score for each potential replacement styling value for the first styling attribute that indicates a compatibility of the potential replacement styling value with the updated digital design;
select, based on the determined updated compatibility scores for each potential replacement styling value for the first styling attribute, an updated replacement styling value for the first styling attribute; and
apply the selected updated replacement styling value to the updated digital design to generate another updated digital design by changing the selected replacement styling value for the first styling attribute of the updated digital design to match the selected updated replacement styling value.

17. The non-transitory computer-readable storage medium as recited in claim 8, further storing instructions thereon that, when executed by the at least one processor, cause the system to receive user input indicating a selected position of a graphical user interface control for modifying the initial digital design.

18. The non-transitory computer-readable storage medium as recited in claim 17, wherein selecting the replacement styling value for the first styling attribute is further based on the received user input.

19. The non-transitory computer-readable storage medium as recited in claim 18, wherein receiving the user input comprises receiving a selected position of a rotatable user interface control.

20. A system comprising:
at least one processor; and
at least one non-transitory computer-readable storage medium storing instructions thereon that, when executed by the at least one processor, cause the system to:
identify a plurality of styling attributes in an initial design of a digital media item, wherein each of the plurality of styling attributes is associated with a plurality of styling values;
determine, for each styling attribute, a compatibility score for each of the plurality of styling values that indicates a compatibility of the styling values with the initial design of the digital media item;
identify, for each styling attribute, styling values having a compatibility score above a predetermined threshold;
generate, for each styling attribute, a probabilistically distributed set of styling values with compatibility scores above the predetermined threshold;
identify a position of a graphical user interface control set by a user;
select styling values from each probabilistically distributed set of styling values based on the identified position of the graphical user interface control;
generate a styling combination of the selected styling values; and
applying the generated styling combination to the initial design of the digital media item to generate an updated design of the digital media item by changing the initial design to match the generated styling combination.

* * * * *